(12) United States Patent
Westlund et al.

(10) Patent No.: US 9,000,314 B2
(45) Date of Patent: Apr. 7, 2015

(54) SWITCH ASSEMBLY HAVING UNINTENTIONAL-ACTUATION GUARD

(71) Applicant: Caterpillar Inc., Peoria, IL (US)

(72) Inventors: Bjorn E. Westlund, Mahomet, IL (US); Adam Plecker, Joliet, IL (US)

(73) Assignee: Caterpillar Inc., Peoria, IL (US)

( * ) Notice: Subject to any disclaimer, the term of this patent is extended or adjusted under 35 U.S.C. 154(b) by 248 days.

(21) Appl. No.: 13/683,342

(22) Filed: Nov. 21, 2012

(65) Prior Publication Data

US 2014/0138218 A1   May 22, 2014

(51) Int. Cl.
*H01H 9/28* (2006.01)
*H01H 9/02* (2006.01)

(52) U.S. Cl.
CPC .................................. *H01H 9/0264* (2013.01)

(58) Field of Classification Search
USPC .......... 200/43.16, 43.14–43.15, 43.11, 43.19, 200/43.21, 329–332, 339, 302.1, 302.3, 553
See application file for complete search history.

(56) References Cited

U.S. PATENT DOCUMENTS

| | | | |
|---|---|---|---|
| 2,200,852 A | 5/1940 | Pond | |
| 4,916,436 A | 4/1990 | Silliman et al. | |
| 5,033,489 A | 7/1991 | Ferre et al. | |
| 5,358,055 A | 10/1994 | Long et al. | |
| 5,791,456 A | 8/1998 | Schaefer | |
| 6,423,916 B1 | 7/2002 | Koebrick | |
| 6,494,526 B2 | 12/2002 | Uno | |
| 6,856,515 B2 | 2/2005 | Holce et al. | |
| 7,789,360 B2 | 9/2010 | Qualy et al. | |
| 2001/0030114 A1* | 10/2001 | Thielman | 200/43.16 |
| 2004/0262138 A1* | 12/2004 | Lee | 200/293 |
| 2007/0171031 A1 | 7/2007 | Hastings | |
| 2008/0190746 A1* | 8/2008 | Gauzin et al. | 200/43.16 |
| 2008/0297600 A1 | 12/2008 | Ito | |
| 2010/0032278 A1* | 2/2010 | Lin | 200/564 |
| 2011/0011710 A1* | 1/2011 | Dodal et al. | 200/302.1 |
| 2012/0067007 A1 | 3/2012 | Lawson et al. | |

FOREIGN PATENT DOCUMENTS

DE          4442312          5/1996

* cited by examiner

*Primary Examiner* — Edwin A. Leon
(74) *Attorney, Agent, or Firm* — Finnegan, Henderson, Farabow, Garrett & Dunner, LLP

(57) ABSTRACT

A switch assembly for use with a mobile machine. The switch assembly may have a substantially enclosed housing with a front side surface and a plurality of other side surfaces, and a switch operatively connected to the front side surface. The switch assembly may also have at least one guard connected to the front side surface and located proximate the switch, and at least one mounting feature associated with at least one of the plurality of other side surfaces. The at least one mounting feature may be configured to engage a support member of the mobile machine.

20 Claims, 2 Drawing Sheets

SWITCH ASSEMBLY HAVING UNINTENTIONAL-ACTUATION GUARD

TECHNICAL FIELD

The present disclosure relates generally to a switch assembly and, more particularly, to a switch assembly having an unintentional-actuation guard.

BACKGROUND

Mobile machines, for example haul trucks and wheel loaders, often have optional equipment that can be added to the machines after the machines have been manufactured and delivered to the customer. Some of this equipment can require operator control devices, such as switches, in order to activate the equipment. Often, these control devices are custom fabrications produced at the customer site by the customer and/or by a local service technician.

Although acceptable in many applications, the custom-fabricated interface devices can be expensive to build and assemble, and may not have sufficient safety features. For example, the control devices may be designed to receive only a single type of switch and mount at a single location and/or in a single configuration on the machine. As such, any change to the equipment controlled by the device and/or to the machine at the control location may necessitate fabrication of a new device. Further, the custom-fabricated control devices may not be equipped with guards and/or covers to protect the switches or prevent unintentional actuation.

An exemplary switch assembly is disclosed in U.S. Pat. No. 5,791,456 that issued to Schaefer on Aug. 11, 1998 ("the '456 patent"). In particular, the '456 patent discloses an electrical overload switch for a dynamoelectric machine. The switch is mounted in a conduit box, and electrical conduits are routed thereto for resetting the dynamoelectric machine after it is shut down due to an overload condition. The conduit box has opposing side and end walls, and an open top and bottom. A bracket on which the switch is mounted is sized to fit in the box adjacent an opening in one wall of the box. One face of the conduit box is curved to match an outer shell of the dynamoelectric machine. Curved mounting flanges are formed at the curved face of the box to receive mounting fasteners that connect the conduit box to the dynamoelectric machine.

Although adequate in some situations, the switch assembly of the '456 patent may have limited application and benefit. In particular, the switch assembly is configured to be mounted to only the dynamoelectric machine and in only one configuration. In addition, the '456 patent provides little or no protection against unintentional actuation of the overload switch.

The disclosed switch assembly is directed to overcoming one or more of the problems set forth above and/or other problems of the prior art.

SUMMARY

In one aspect, the present disclosure is directed to a switch assembly for a machine. The switch assembly may include a substantially enclosed housing having a front side surface and a plurality of other side surfaces, and a switch operatively connected to the front side surface. The switch assembly may also include at least one guard connected to the front side surface and located proximate the switch, and at least one mounting feature associated with at least one of the plurality of other side surfaces. The at least one mounting feature may be configured to engage a support member of the machine.

In another aspect, the present disclosure is directed to another switch assembly. This switch assembly may include a substantially enclosed housing having a front side surface, a back side surface, a top side surface, a left side surface, and a right side surface. The housing may be open at a side opposite the top side surface. The switch assembly may also include a switch operatively connected to the front side surface, and a movable cover associated with the switch. The switch assembly may further include at least one guard connected to the front side surface and located proximate the switch, and two mounting feature removably connectable along a length direction of either of the left and right side surfaces. The two mounting features may be configured to engage a support member of the machine.

In yet another aspect, the present disclosure is directed to a mobile machine. The mobile machine may include a frame, a power source mounted to the frame, and a plurality of traction devices configured to support the frame and driven by the power source. The mobile machine may also include an auxiliary component operatively mounted to the frame and powered by the power source, a platform connected to the frame opposite the plurality of traction devices, and a railing substantially surrounding the platform. The mobile machine may further include a substantially enclosed housing having a front side surface, a back side surface, a top side surface, a left side surface, and a right side surface. The housing may be open at a side opposite the top side surface. The mobile machine may additionally include a switch operatively connected to the front side surface of the housing and movable by an operator of the mobile machine to affect operation of the auxiliary component, and a movable cover associated with the switch. At least one guard may be connected to the front side surface and located proximate the switch, and two mounting feature may be removably connectable along a length direction of either of the left and right side surfaces and configured to engage a vertical member of the railing.

DETAILED DESCRIPTION

Figure 1:
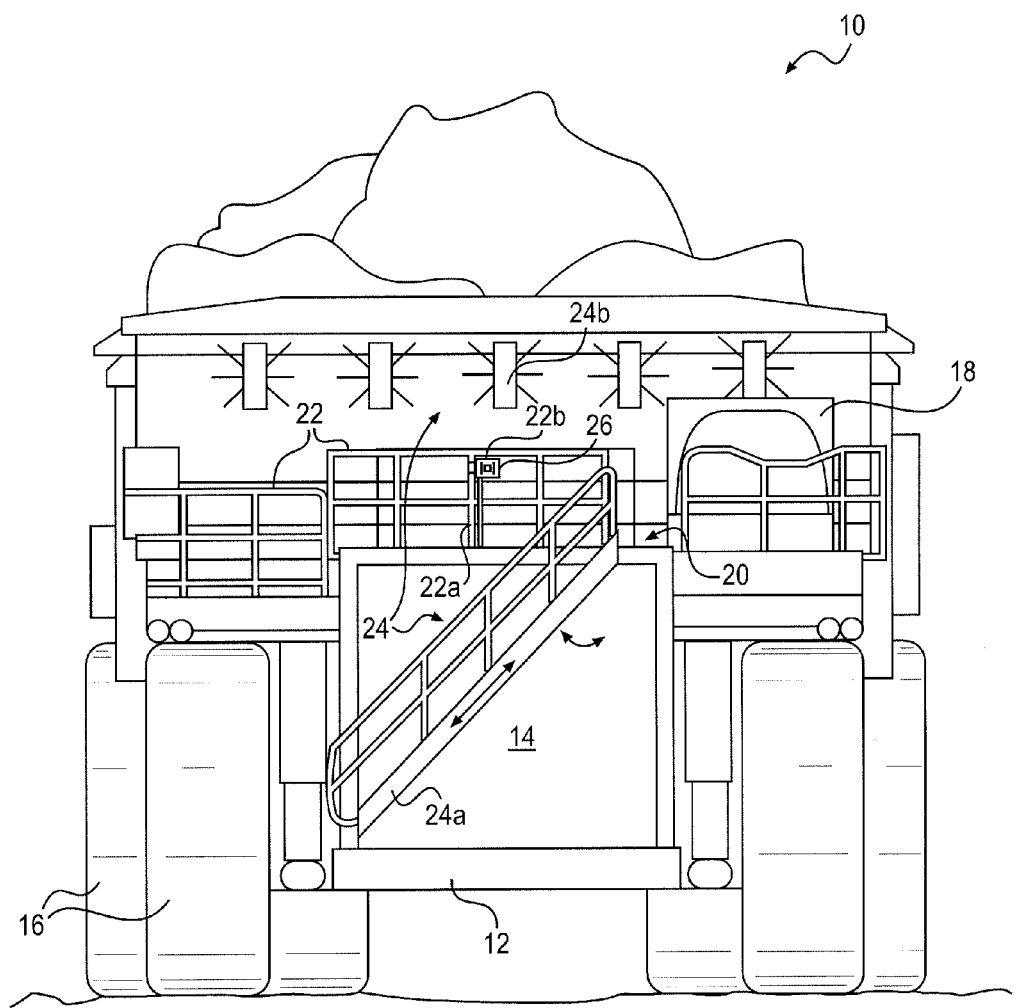
FIG. 1 is a pictorial illustration of an exemplary disclosed mobile machine.

FIG. 1 illustrates an exemplary machine 10. Machine 10, in the disclosed example, is a mobile earth-moving machine such as a haul truck that is configured to be loaded with material at a first location, transport the material from the first location to a second location, and unload the material at the second location. It is contemplated, however, that machine 10 may be another type of mobile machine, if desired, such as a scraper, a wheel loader, or a motor grader, or a stationary machine such as a pumping station or a power generating module.

Machine 10, as a mobile machine, may include a frame 12, a power source 14 mounted to frame 12, and a plurality of traction devices 16 configured to support frame 12 and driven by power source 14. In the disclosed embodiment, power source 14 is an engine, for example an internal combustion engine. However, power source 14 may alternatively embody another source of power such as a fuel cell, a battery, a motor, a tether line, etc. Power source 14 may be connected to traction devices 16 by way of one or more driveshafts and or a transmission (not shown). In the disclosed example, traction devices 16 are tires, although other traction devices may alternatively be utilized. Frame 12 of machine 10 may support an operator station 18, and a platform 20 allowing the operator to move about machine 10 and/or to gain access to operator station 18. In some embodiments, a railing (or other support member) 22 is provided that surrounds platform 20 and provides support for the operator. Operator station 18 may have one or more interface devices located proximate a seat that provide the operator with the ability to control functions and operations of machine 10.

Machine 10 may be used for many different applications at many different types of locations. Accordingly, there may be times when additional optional equipment (auxiliary components) 24 can enhance the use of machine 10. Optional equipment 24 may be available from the manufacturer of machine 10 or may be provided from another source. In either situation, control equipment must be added to machine 10 to facilitate use of optional equipment 24. For example, an owner or operator at a particular mine site may desire to add a powered access system 24a that improves the operator's ability to reach operator station 18. In this situation, powered access system 24a may include a ladder or stairs that are movable and an actuator (not shown) that raises, lowers, rotates, or otherwise extends the ladder. In another example the owner or operator at the same or different work site may desire to add additional lighting 24b to machine 10. In either situation the powered access system 24a and the additional lighting 24b may need to have a control device used by the operator to regulate operation of the optional auxiliary component 24.

In the disclosed embodiment shown in FIG. 1, the control device is a switch assembly 26 mountable to railing 22 of machine 10. In particular switch assembly 26 is shown in FIG. 1 as being mounted to the side of a vertical rail member 22a of railing 22. It is contemplated, however, that switch assembly 26 may alternatively be mounted to any rail member of railing 22. For example switch assembly 26 may be mounted to the left side or the right side of vertical rail member 22a or to the top or bottom of a horizontal rail member 22b. Switch assembly 26 may be mounted at any suitable location around platform 20, around or within operator station 18, or at another location such that the operator has suitable access to switch assembly 26. In some embodiments, the operator may need to have a view of auxiliary component 24 during actuation thereof. For this reason, switch assembly 26 is shown in FIG. 2 as being located outside of operator station 18 on railing 22 of machine 10.

Figure 2:
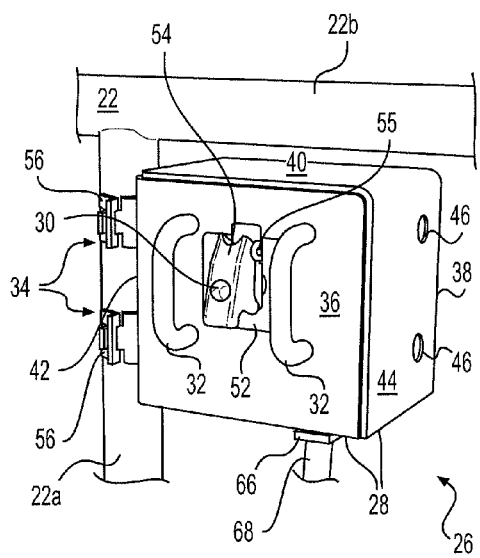
FIGS. 2-4 are pictorial illustrations from different viewpoints of an exemplary disclosed switch assembly that may be used in conjunction with the mobile machine of FIG. 1.

An exemplary embodiment of switch assembly 26 shown in FIG. 2. In this embodiment, switch assembly 26 is mounted to the right side of vertical rail member 22a, and below horizontal rail member 22b. By being located below horizontal rail member 22b, protection from falling objects (e.g., material from a dump bed of machine 10) may be provided for switch assembly 26.

Switch assembly 26 may include a substantially enclosed housing 28, a switch 30 mounted to housing 28, at least one guard 32 associated with switch 30, and one or more mounting features 34 that allow connection to railing 22. Housing 28 may be an assembly of different side surfaces, including a front side surface 36, a back side surface 38, a top side surface 40, a left side surface 42, and a right side surface 44 that are all joined together to form the enclosure. In the embodiment of FIG. 2, housing 28 is open at the bottom (a side opposite top side surface 40). It is contemplated, however, that the bottom of housing 28 may be closed if desired. Switch 30 may be mounted at front side surface 36. Guard(s) 32 may also be connected to front side surface 36, proximate switch 30. Mounting features 34 may be removably connected to left side surface 42 or to right side surface 44, as desired in order to accommodate the particular mounting location selected by the operator.

Each of the side surfaces of housing 28 may be fabricated from sheet metal stock having a generally uniform thickness. In the disclosed embodiment, the thickness may be about 3 mm and each side surface may be fabricated through a stamping process and welded together. It is contemplated, however, that other thicknesses, material, and/or fabrication processes may alternatively be utilized. In some embodiments, multiple side surfaces may be formed from an integral component. For example, front side surface 36, back side surface 38, and left side surface 42 may be stamped as a single component and then bent to form the three side surfaces. Similarly, top side surface 40 and right side surface 44 may be stamped from a single integral component and then bent to form the two side surfaces. It is contemplated that any combination of the five side surfaces described above may be formed from a single integral component. After formation of multiple side surfaces from a single integral component, the single integral component may be welded to the remaining components to form housing 28.

Figure 4:
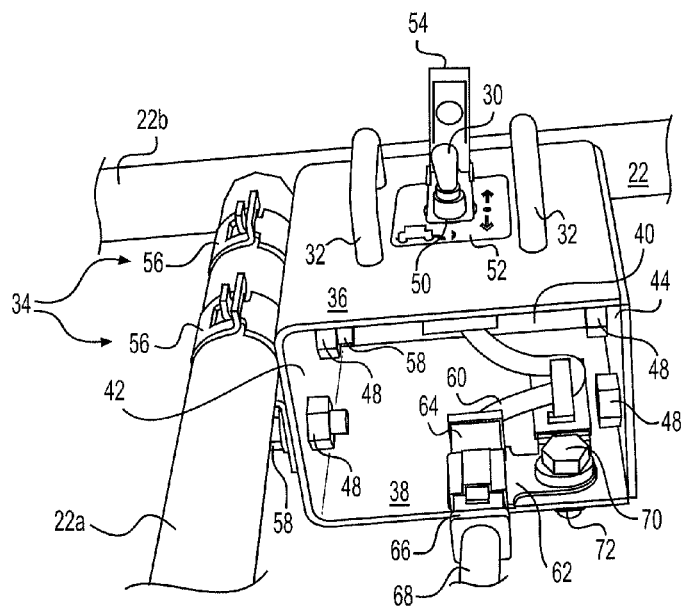

Each of left and right side surfaces 42, 44 may include geometry that accommodates mounting features 34. In the disclosed embodiment, this geometry includes two holes 46 in left and right side surfaces 42, 44 and, as shown in FIG. 4, two nuts 48 that have been welded inside housing 28 at holes 46 in left and right side surfaces 42, 44. Holes 46 and nuts 48 may be generally aligned in a lengthwise direction of left and right side surfaces 42, 44. Although this geometry is only shown in association with left and right side surfaces 42, 44, it is contemplated that the geometry may additionally or alternatively be added to top side surface 40, back side surface 38, and/or front side surface 36, if desired. It is also contemplated that different geometry may be utilized in place of holes 46 and nuts 48, if desired.

As also shown in FIG. 2, switch 30 may be a toggle switch movable between two discrete positions to affect operation of auxiliary component 24 (referring to FIG. 1). For example, switch 30 may be moved between a first position and a second position to generate a signal that causes the ladder of powered access system 24a to be raised or lowered or lighting 24b to be turned on and off. For example, the signal may be communicated directly with the particular auxiliary component 24 to provide power that causes the component 24 to activate or, instead, may be communicated with a controller (not shown) that directs power to the component 24 in response to the signal. It should be noted, however, that switch 30 may be any other type of switch known in the art. For example, switch 30 may be a return-to-center switch or a momentary switch, if desired. Switch 30 may be received within a hole 50 (shown only in FIG. 4) formed in front side surface 36, and include hardware (not shown) that locks switch 30 to housing 28.

In some embodiments, instruction graphics 52 may be located on front side surface 36 and associated with switch 30 (e.g., at, around, on, etc.). Graphics 52 may show, for example, that the first or uppermost position of switch 30 corresponds with raising of the ladder of powered access system 24a (or activation of lights 24b), and that the second or lowermost position corresponds with lowering of the ladder or (deactivation of lights 24b). In the disclosed embodiment, instruction graphics 52 are included in the form of a decal that is pasted to front side surface 36 around switch 30. Other ways of including instruction graphics 52 (e.g., etching within front side surface 36) may also be utilized.

A cover 54 is shown in association with switch 30 of FIG. 2. In this embodiment, cover 54 is meant to protect switch 30 from damage, from precipitation, and/or from other environmental effects. Cover 54 may also help prevent unintentional activation of switch 30 in some situations. The particular cover 54 shown in FIG. 2 is hinged at a top edge 55 and liftable by the operator to provide access to switch 30. When released by the operator, cover 54 under the force of gravity should fall down over switch 30. Other configurations may also be utilized.

Guard 32, in the disclosed embodiment, is a rod that has been bent into a generally C-shaped configuration and connected at opposing ends to front side surface 36 of housing 28. Two rods are shown in FIG. 2, one located at each transverse side of switch 30. In this configuration, the opposing ends of each guard 32 are oriented in a lengthwise direction of front side surface 36. It should be noted that fewer or more rods may be included, if desired. It is also contemplated that other configurations of guards 32 may be utilized.

Guards 32 may be intended to inhibit unintentional activation of switch 30. In particular, with guards 32 being located at the transverse sides of switch 30, an operator walking along platform 20 (referring to FIG. 1) past switch assembly 26 may be inhibited by guards 32 from unintentionally bumping against and engaging switch 30. Because guards 32 may be located at both sides of switch 30, the operator may be blocked from bumping against switch 30 when walking in either direction (i.e., toward or away from operator station 18) along platform 20.

Figure 3:
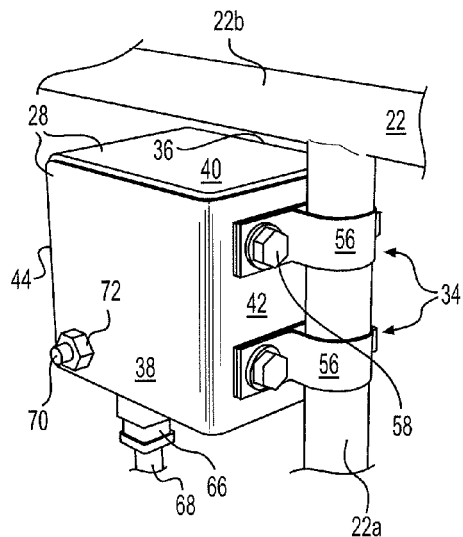

Mounting features 34 may be configured to engage the geometry of left and right side surfaces 42, 44 and also connected to railing 22. For example, the exemplary mounting features 34 shown in FIG. 3 include compression bands 56 that are connectable to left and right side surfaces 36, 38 of housing 28 by way of bolts 58 that engage nuts 48 (referring to FIG. 4) inside housing 28. Compression bands 56 may be configured to pass around vertical rail member 22a of railing 22, with opposing ends of each compression band 56 being connected to housing 28 by one of bolts 58. In this configuration, as bolts 58 are tightened to housing 28, compression bands 56 may also be tightened around vertical rail member 22a, thereby holding switch assembly 26 in place. The particular compression bands 56 shown in FIGS. 2-4 are two-piece bands, although other types of compression bands 56 and/or other types of mounting features 34 may alternatively be utilized.

As shown in FIG. 4, an internal wiring harness 60 may extend into housing 28 and be held in place by way of a clip 62 that is bolted to back side surface 38 of housing 28. Internal wiring harness 60 may extend from switch 30 to an internal connector 64 configured to engage a complimentary external connector 66 of an external wiring harness 68. External wiring harness 66 may extend to auxiliary component 24 (referring to FIG. 1), to the controller (not shown), and/or to power source 14 described above. Although clip 62 is shown as engaging both connector 64 and internal wiring harness 60, it is contemplated that clip 62 may alternatively engage only one of connector 64 and internal wiring harness 60, if desired. It is also contemplated that more than one clip 62 may be included within housing 28 for this purpose. Clip(s) 62 may be held in place by a bolt 70 that passes through back side surface 38 of housing 28 and, and a nut 72 that engages a distal end of bolt 70 outside of housing 28.

Industrial Applicability

The disclosed switch assembly may be applicable to any machine (mobile or stationary) where unintentional actuation is undesirable and where versatile mounting configurations are beneficial. The disclosed switch assembly may inhibit unintentional actuation through the use of switch guards and covers. The disclosed switch assembly may also provide for versatile mounting configurations via rail-engaging mounting features that are connectable to different side surfaces of the switch assembly.

It will be apparent to those skilled in the art that various modifications and variations can be made to the disclosed switch assembly without departing from the scope of the disclosure. Other embodiments of the switch assembly will be apparent to those skilled in the art from consideration of the specification and practice of the switch assembly disclosed herein. It is intended that the specification and examples be considered as exemplary only, with a true scope being indicated by the following claims and their equivalents.

What is claimed is:

1. A switch assembly for a machine, comprising:
    a substantially enclosed housing having a front side surface and a plurality of other side surfaces, wherein the plurality of other side surfaces includes a left side surface, a right side surface, a top side surface, and a back side surface;
    a switch operatively connected to the front side surface;
    at least one guard connected to the front side surface and located proximate the switch; and
    at least one mounting feature removably connected through holes in at least one of the left and right side surfaces, and configured to engage a support member of the machine.

2. The switch assembly of claim 1, wherein the switch is one of a toggle switch, a return-to-center switch, or momentary switch.

3. The switch assembly of claim 1, wherein at least two of the plurality of other side surfaces are formed from a single component.

4. The switch assembly of claim 3, wherein:
    the front side surface, the back side surface, and one of the left and right side surfaces are formed from a first integral component.

5. The switch assembly of claim 4, wherein the top side surface and the other of the left and right side surfaces are formed from a second integral component.

6. The switch Assembly of claim 5, wherein the first and second integral components are connected to each other by welding.

7. The switch assembly of claim 5, wherein the housing is open at a bottom side opposite the top side surface.

8. The switch assembly of claim 1, wherein the at least one guard includes:
    a first rod located at a first side of the switch; and
    a second rod located at a second side of the switch opposite the first rod.

9. The switch assembly of claim 8, wherein each of the first and second rods are generally C-shaped and connected at opposing ends to the front side surface of the housing.

10. The switch assembly of claim 1, wherein the switch includes a movable cover.

11. The switch assembly of claim 1, wherein the at least one mounting feature includes a compression band connectable to multiple of the plurality of other side surfaces of the housing.

12. The switch assembly of claim 11, wherein the compression band is bolted to the housing.

13. The switch assembly of claim 12, further including at least one nut connected to an interior of the housing and configured to receive a bolt the holds the compression band in place.

14. The switch assembly of claim 11, wherein the at least one mounting feature includes two mounting features aligned along a length of the housing.

15. The switch assembly of claim 11, wherein the at least one mounting feature is removably connectable at opposing sides surfaces of the plurality of other side surfaces of the housing.

16. The switch assembly of claim 1, further including a clip operatively connected inside the housing and configured to receive a wiring harness that extends to the switch.

17. The switch assembly of claim 1, further including an instruction graphic connected to the front side surface of the housing at the switch.

18. A switch assembly for a machine, comprising:
   a substantially enclosed housing having a front side surface, a back side surface, a top side surface, a left side surface, and a right side surface, the housing being open at a side opposite the top side surface;
   a switch operatively connected to the front side surface;
   a wiring harness extending from the switch to a connector, wherein the wiring harness is held in place by way of a clip that is bolted to the back side surface;
   a movable cover over the switch;
   at least one guard connected to the front side surface and located proximate the switch; and
   two mounting features removably connectable through holes in and along a length direction of either of the left and right side surfaces and configured to engage a support member of the machine.

19. The switch assembly of claim 18, wherein:
   the front side surface, the back side surface, and one of the left and right side surfaces are formed from a first integral component;
   the top side surface and the other of the left and right side surfaces are formed from a second integral component; and
   the first and second integral components are connected to each other by welding.

20. A mobile machine, comprising:
   a frame;
   a power source mounted to the frame;
   a plurality of traction devices configured to support the frame and driven by the power source;
   an auxiliary component operatively mounted to the frame and powered by the power source;
   a platform connected to the frame opposite the plurality of traction devices;
   a railing substantially surrounding the platform;
   a substantially enclosed housing having a front side surface, a back side surface, a top side surface, a left side surface, and a right side surface, the housing being open at a side opposite the top side surface;
   a switch operatively connected to the front side surface of the housing and movable by an operator of the mobile machine to affect operation of the auxiliary component;
   a movable cover over the switch;
   at least one guard connected to the front side surface and located proximate the switch; and
   two mounting features removably connectable through holes in and along a length direction of either of the left and right side surfaces and configured to engage a vertical portion of the railing.

* * * * *

UNITED STATES PATENT AND TRADEMARK OFFICE
CERTIFICATE OF CORRECTION

PATENT NO. : 9,000,314 B2
APPLICATION NO. : 13/683342
DATED : April 7, 2015
INVENTOR(S) : Westlund et al.

Page 1 of 1

It is certified that error appears in the above-identified patent and that said Letters Patent is hereby corrected as shown below:

IN THE SPECIFICATION

Column 5, line 64, delete "Industrial Applicability" and insert -- INDUSTRIAL APPLICABILITY --.

IN THE CLAIMS

Column 7, line 6, In claim 15, delete "sides" and insert -- side --.

Signed and Sealed this
First Day of March, 2016

Michelle K. Lee
*Director of the United States Patent and Trademark Office*